May 25, 1965  W. J. EGGINGTON ETAL  3,185,240
AIR-CUSHION BORNE VEHICLES
Filed Jan. 15, 1963  4 Sheets-Sheet 4

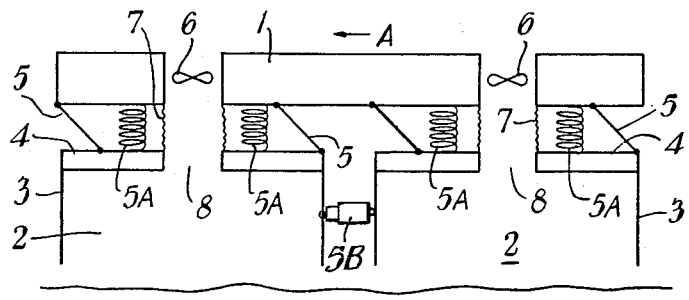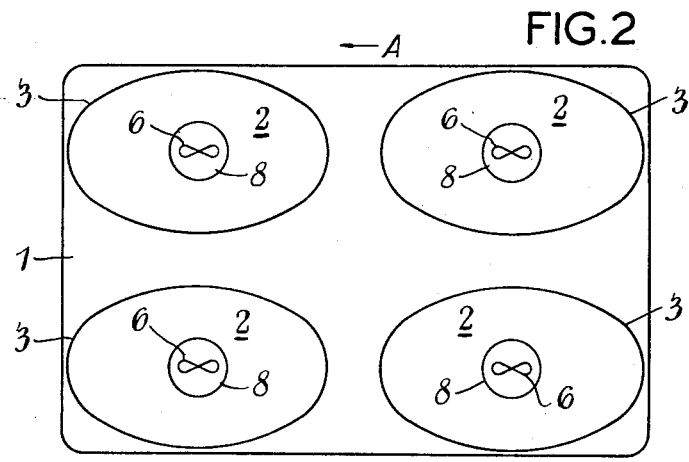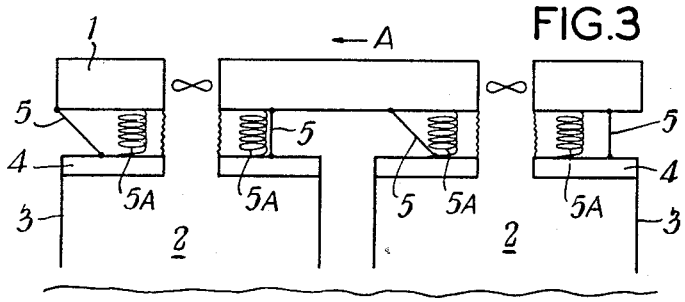

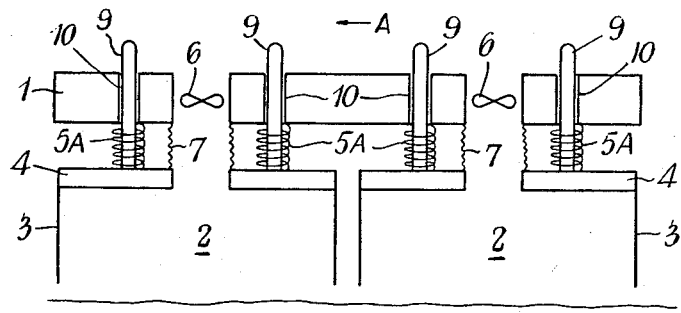
FIG.4
FIG.5
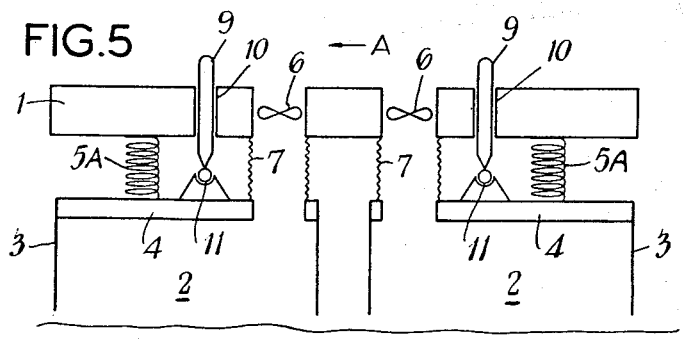
FIG.6
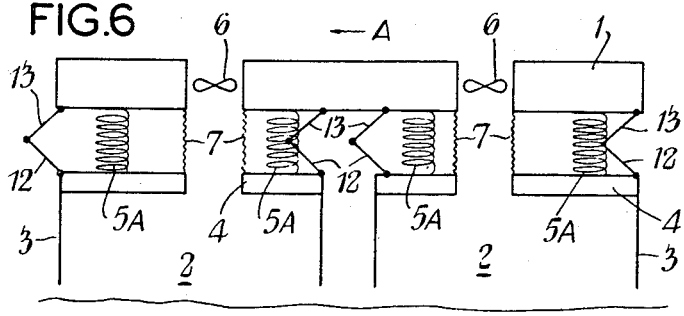

INVENTOR
WILFRED JAMES EGGINGTON,
NIGEL WICKHAM LEWIS,

BY Pennie Edmonds Morton
Taylor and Adams
ATTORNEYS

United States Patent Office 3,185,240
Patented May 25, 1965

3,185,240
AIR-CUSHION BORNE VEHICLES
Wilfred James Eggington, Highworth, and Nigel Wickham Lewis, Swindon, England, assignors to Vickers-Armstrongs (Engineers) Limited, London, SW. 1, England, a British company
Filed Jan. 15, 1963, Ser. No. 251,517
Claims priority, application Great Britain, Jan. 25, 1962, 2,937/62
13 Claims. (Cl. 180—7)

This invention relates to vehicles.

According to the present invention there is provided a vehicle adapted to be at least partially supported on a plurality of air cushions and comprising a vehicle body and a plurality of cells partially enclosing the cushions, the cells each being open at the bottom and having a top part from which a skirt depends for encircling an associated cushion, there being means connecting the top parts of the cells to the vehicle body and the arrangement being such that the cells can move relative to the body and relative to each other.

For a better understanding of the invention and to show how the same may be carried into effect, reference will now be made, by way of example, to the accompanying drawings, in which:

FIGURE 1 is a diagrammatic sectional elevation of an air cushion borne vehicle,

FIGURE 2 is a diagrammatic underneath plan view of the vehicle of FIGURE 1,

Figure 7:
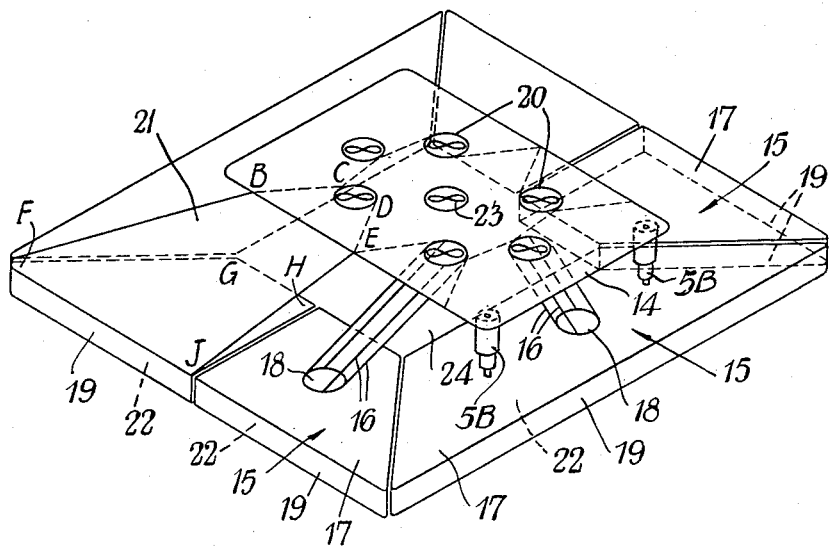
Figure 8:
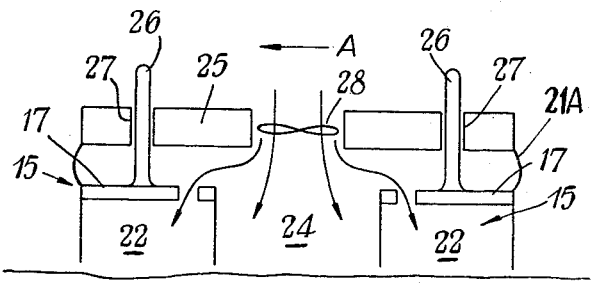
Figure 6A:
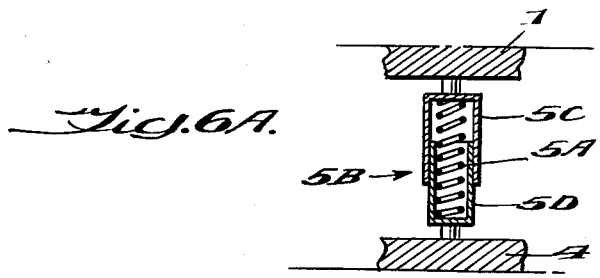
Figure 9:
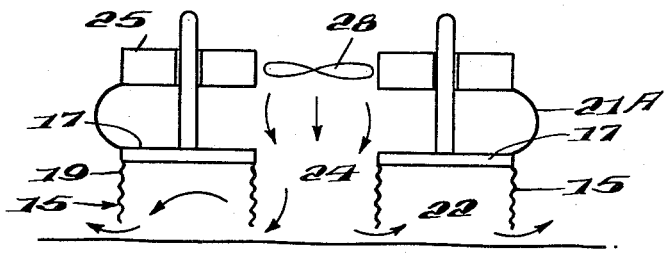
Figure 10:
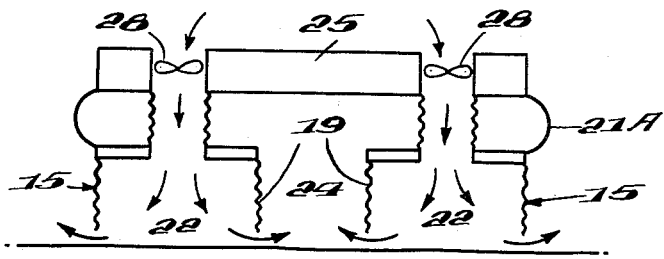

FIGURES 3 to 6 are diagrammatic sectional elevations of modified forms of the vehicle of FIGURE 1, FIGURE 6A is, to an enlarged scale, a sectional elevation of a spring assembly, FIGURE 7 is a diagrammatic partly broken-away perspective view of a further air cushion borne vehicle, FIGURE 8 is a diagrammatic sectional elevation of a modified form of the vehicle of FIGURE 7, and FIGURES 9 and 10 are diagrammatic sectional elevations of two different modified forms of the vehicle of FIGURE 8.

The vehicle of FIGURES 1 and 2 has a body 1 carried on four air cushions 2 each of which is encircled by a flexible skirt 3 depending from a cover plate 4. Each cover plate 4 is secured to the underside of the vehicle body 1 by parallel linkages 5, each linkage being pivotally connected at one end to the cover plate 4 and at the other end to the underside of the vehicle body 1. The body 1 is supported on the plates 4 by diagrammatically illustrated suspension springs 5A. A fan 6 associated with each cushion 2 is provided on the vehicle body 1 and delivers air to the cushion 2 via a flexible duct 7 and an opening 8 in the cover plate 4.

The flexible skirt 3 is of rubber, synthetic rubber or similarly flexible material and may be constructed as described in any one of commonly owned copending United States patent applications Ser. Nos. 210,451, filed July 17, 1962, 211,013, filed July 19, 1962, 215,713, filed August 8, 1962 and 315, 747, filed October 14, 1963. These applications describe skirts for air borne vehicles made of a series of adjacent discrete flexible members which may be triangular or trapezoidal in cross-section and which hang downwardly to enclose an air cushion. The members may be provided with flaps which overlap adjacent members or connected by a flexible sheet material which may be continuous. The members may be made of rubber, nylon or other suitable flexible materials.

The intended direction of motion of the vehicle of FIGURES 1 and 2 is indicated by the arrows A. When the vehicle is in motion and the lower edge of one of the skirts 3 encounters the ground the cell formed by this skirt 3 and the associated cover plate 4 is free to move backwards and upwards relative to the body 1 and independently of the other three cells by virtue of the articulated connection between the cells and the vertical body 1.

FIGURE 3 shows a modified form of the vehicle of FIGURES 1 and 2 in which the front linkages 5 associated with each cell are inclined rearwardly and downwardly whilst the rear linkages associated with each cell are upright when the vehicle is in forward motion in the direction of the arrow A and the skirts 3 are clear of the ground so that the cells are hanging freely from the vehicle body. Whenever a skirt 3 encounters the ground the front of the associated cell rises with respect to the rear of the cell by virtue of the disposition of the linkages 5. The cell also rises bodily to a slight extent.

FIGURE 4 illustrates a modified version of the vehicle of FIGURES 1 and 2 in which the linkages 5 are replaced by guide rods 9 projecting upwardly from the cover plates 4 and engaged in bores 10 in the vehicle body 1. The co-operation between the rods 9 and bores 10 is such that the cells can heave independently of each other. In the vehicle of FIGURE 5 each cell is connected to the body 1 by a single guide rod 9 engaged in a bore 10 in the body 1, the lower end of the rod 9 being pivotally connected to the cover 4 of the cell by means of a ball and socket joint 11. Thus with the vehicle of FIGURE 5 each cell is free to pitch, roll and heave independently of the other cells.

The vehicle of FIGURE 6 is a modified form of the vehicle of FIGURES 1 and 2 in which each linkage 5 is replaced by a hinged knee-type linkage arrangement each consisting of two links 12 and 13 pivoted together, the link 13 being pivotally connected to the underside of the vehicle body 1 and the link 12 being pivotally connected to the top of the associated cover plate 4.

In the embodiments described above the arrangement of the springs 5A is shown diagrammatically. In practice the springs 5A are incorporated in spring assemblies 5B (FIGURE 6A) of conventional form, each such assembly having the spring 5A disposed within two telescopic tubes 5C, 5D, the upper tube 5C having its upper end closed and pivotally connected to the underside of the vehicle body 1, and the lower tube 5D having its lower end closed and pivotally connected to the top of the associated cover plate 4. The assembly 5B acts as a dash-pot or damper by virtue of the restriction on flow of air into and out of the assembly between the telescoping surfaces of the tubes 5C, 5D, upon extension and contraction of the assembly.

The vehicle of FIGURE 7 has a body an underside plate 14 of which is connected to cells 15 beneath the body by parallel linkages 16. Each cell 15 consists of a cover plate 17 having an opening 18 and a flexible skirt 19 depending from the peripheral part of the plate 17. The skirt 19 is of rubber, synthetic rubber or similarly flexible material and may be constructed as described in any one of said copending patent applications. The cells 15 which are disposed around the peripheral part of the underside of the plate 14 and project laterally beyond the border of the plate 14 are supplied with air by fans 20 in the vehicle body, there using a thin flexible membrane 21 enclosing each set of parallel linkages 16 and forming a duct for conveying air from one of the fans 20 to the opening 18 of the associated cell 15. The upper part of each membrane 21 is secured to the underside of the plate 14 as, for example, along BCDE whilst the lower part of the membrane is secured around the border of the top of the associated cell 15, for example, along FGHJ. The air from the fans 20 enters the cells 15 and forms air cushions 22. The space beneath the body that is surrounded by the cells 15 is fed with air by a fan 23 and forms an air cushion 24. Adjacent membranes 21 are connected to each other along EJ by a folded membrane (not shown) so that the membranes 21 and the folded membranes co-operate to enclose the upper part of said space and the cells 15 form a partial peripheral seal for the cushion 24. The vehicle body is supported by the air cushions 21 and 24 through the intermediary of suspension spring asssemblies 5B connected between the plate 14 and the plates 17. When the vehicle of FIGURE 7 is in motion and the bottom edge of one of the skirts 19 encounters the ground the associated cell is, because of the linkages 16, free to move relative to the plate 14 and independently of the other cells 15.

FIGURE 8 shows a modified form of the vehicle of FIGURE 7 in which each cell is connected to the vehicle body 25 for vertical movement with respect thereto. To this end each cell 15 has a guide rod 26 extending upwardly from the upper side of the cover plate 17, the rod 26 being engaged in a vertical bore 27 in the body 25. The membranes 21 are replaced by a single encircling membrane 21A. With such an arrangement each cell 15 is able to heave independently of the other cells 15. A single fan 28 is provided for feeding air to the cells and to the cushion 24.

It will be understood that it is possible to modify the vehicle of FIGURE 7 to alter the way in which the air is supplied to the cushions 22 and 24. For example, as shown in FIGURE 9, there may be a single fan 28 supplying the cushion 24, the cushion 22 receiving air from the cushion 24 via the under edges of the inner parts of the skirts 19. It is also possible as shown in FIGURE 10 to feed air to the cells 15 directly from compressors 28 and to supply the cushion 24 from the cells 15 by passing air inwards under the inner parts of the skirts 19.

In the vehicles mentioned above assemblies 5B may be provided between the cells, for example as shown in FIGURE 1, to effect partial restraint on the movements of the cells with respect to each other.

We claim:

1. A vehicle adapted to be at least partially supported on air cushions, the vehicle comprising a body, a plurality of plenum chamber cells for containing the air cushions, each cell having a top part and a flexible skirt depending from the periphery of said top, each cell being open at the bottom, means for connecting the cells to said body for independent movement of the cells relative to each other and to the body, said connecting means comprising at least one linkage and one resilient means both pivotally secured to the vehicle body and to said cells, said resilient means effecting partial restraint of movement of said cells with respect to the vehicle body and flexible duct means associated with the cells, and means for supplying air through said duct to said cells to form the air cushions.

2. A vehicle as claimed in claim 1 wherein said connecting means connects each of said cells to said vehicle body.

3. A vehicle as claimed in claim 1, wherein said linkage consists of two links pivotally attached together.

4. A vehicle as claimed in claim 1 wherein said linkage extends from the vehicle body downwardly and rearwardly.

5. A vehicle as claimed in claim 1, and including dashpots connected between the cells and the vehicle body.

6. A vehicle as claimed in claim 1, and further comprising resilient means acting between the cells for effecting partial restraint of the movements of the cells with respect to each other.

7. A vehicle as claimed in claim 6, and including dashpots connected between the cells.

8. A vehicle adapted to be at least partially supported on air cushions, the vehicle comprising a body, a plurality of plenum chamber cells for containing the air cushions, each cell having a top part and a flexible skirt depending from the periphery of said top, each cell being open at the bottom, means for connecting the cells to said body for independent movement of the cells relative to each other and to the body, said connecting means comprising at least two non-parallel linkages pivotally secured to the vehicle body and said cells, and means for supplying air to said cells to form the air cushions.

9. A vehicle as claimed in claim 8, wherein there are front links joining the front parts of the cells to the underside of the vehicle body and rear links joining the rear parts of the cells to the underside of the vehicle body, the front links extending downwardly and rearwardly and the rear links being substantially upright when the associated cell is hanging freely from the vehicle body.

10. A vehicle as claimed in claim 8, wherein the supplying means is carried on the vehicle body, there being flexible ducts for conveying the air from the supplying means to the cells.

11. A vehicle as claimed in claim 8, and including resilient means acting between the cells and the vehicle body for effecting partial restraint of the movements of the cells with respect to the vehicle body.

12. A vehicle as claimed in claim 8, wherein each cell is connected to the vehicle body by said non-parallel linkage.

13. A vehicle as claimed in claim 12, including a flexible duct means associated with each cell for conveying air from said supplying means to said cells.

References Cited by the Examiner

UNITED STATES PATENTS

| 1,123,589 | 1/15 | Porter | 180—7 |
| 3,097,718 | 7/63 | Jay | 180—7 |

FOREIGN PATENTS

| 1,238,499 | 7/60 | France. |

FERGUS S. MIDDLETON, *Primary Examiner.*

MILTON BUCHLER, *Examiner.*